United States Patent [19]

Gonzales et al.

[11] Patent Number: 5,031,659
[45] Date of Patent: Jul. 16, 1991

[54] SEWER LINE RELIEF VALVE

[76] Inventors: Henry G. Gonzales, 3602 Dalraida Dr.; Joe H. Gonzales, 3038 Quail Springs B1, both of Corpus Christi, Tex. 78414

[21] Appl. No.: 637,698

[22] Filed: Jan. 7, 1991

[51] Int. Cl.⁵ .............................................. F16K 15/03
[52] U.S. Cl. ................................. 137/527.6; 137/360; 137/527.8; 4/211
[58] Field of Search .................... 4/211, 219; 137/357, 137/360, 527, 527.6, 527.8

[56] References Cited

U.S. PATENT DOCUMENTS 3,815,629  6/1974  Oberholtzer .................. 137/527.8
4,039,004  8/1977  Luthy ........................... 137/527.8 X
4,917,147  4/1990  Jerkins ......................... 137/527.6

Primary Examiner—Robert G. Nilson
Attorney, Agent, or Firm—G. Turner Moller

[57] ABSTRACT

A backwater escape valve comprises a threaded shank received in the threaded opening of a clean out. A pivotally mounted valve body provides a frustoconical valve element and is biased by a spring or by gravity into a closed position against a mirror image frustoconical valve seat. Means are provided to limit opening movement of the valve body in a range of 20°-60° away from the valve seat. The valve seat member is configured to be fully opening and of maximum internal diameter.

7 Claims, 2 Drawing Sheets

SEWER LINE RELIEF VALVE

This invention relates to a sewer line relief valve and more particularly to a simple valve which acts as a backwater escape valve.

Residential and commercial plumbing systems back up into ground floor sinks and commodes when the sewer line plugs up. When the building has multiple floors in which the upstairs and plumbing systems are interconnected, discharge from all upstairs fixtures flows out of downstairs fixtures when the sewer line backs up.

To clear such blockages, plumbing systems are required by building code to have clean outs at various locations. Typically, a large clean out is located near the building in the horizontal run toward the municipal sewer line or septic tank. Smaller clean outs are typically provided in exterior walls adjacent kitchen sinks. Clean outs are typically a tee having a removable threaded plug providing access to the interior of the drain line. By removing the threaded plug, any discharge from the building flows onto the ground rather than backing up through the downstairs sinks or toilets. To remove the blockage, the threaded plug is removed to insert a conventional plumbing snake into the conduit.

To prevent backup from the sewer line from overflowing sinks, shower stalls, toilets or the like, it is known to provide backwater escape valves as shown in U.S. Pat. Nos. 3,603,340; 3,805,826; 3,815,629; 3,852,836; 4,261,386; 4,475,571; 4,850,059; and 4,917,147. These valves of the prior art are installed by removing the threaded plug of a clean out and replacing it with a relief valve of some description. Other disclosures of interest relative to this invention are U.S. Pat. Nos. 168,517; 480,374; 1,553,940; 1,763,562; 1,978,507; 2,602,168; 2,766,841; 2,908,286; and 4,039,004.

Many of the backwater escape valves of the prior art are much too complicated for use in plumbing systems where trouble free use for many years is expected. The simpler backwater escape valves of the prior art have disadvantages of one sort or another so there is not currently available a satisfactory, inexpensive, more-or-less foolproof backwater escape valve that can readily be incorporated into a clean out fitting.

In summary, this invention comprises a simple, elegant valve construction for a backwater escape valve. The valve is preferably of injection molded plastic having a body member providing external threads receivable in the threaded opening of a clean out. The body member provides a frustoconical valve seat concentric about the threaded opening. The valve member is pivoted to the body member and provides a mirror image frustoconical valve element.

An object of this invention is to provide a simple, inexpensive, fool proof backwater escape valve.

Another object of this invention is to provide a backwater escape valve comprising two plastic injection molded parts which are simply pinned together.

These and other objects of this invention will become more fully apparent as this description proceeds, reference being made to the accompanying drawing and appended claims.

IN THE DRAWINGS

Figure 1:
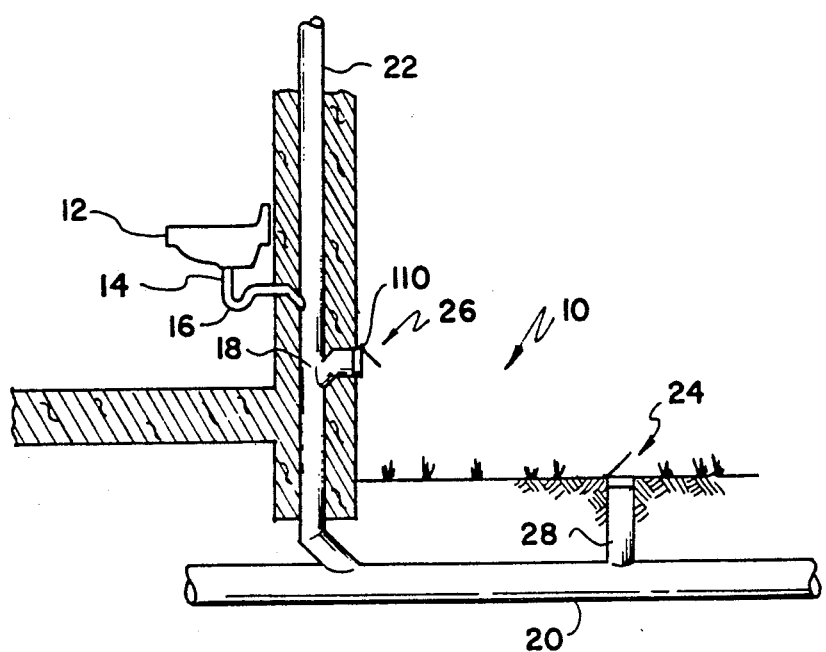
FIG. 1 is a stylized cross-section of a residential building showing a pair of clean outs.

Referring to FIG. 1, a conventional residential sewage collection system 10 is partially illustrated, comprising a plurality of sewage collection receptacles such as a kitchen sink 12. Discharge from the sink 12 drains by gravity through a line 14, a trap 16, a vertical collection line 18 and a nearly horizontal sewage collection line 20. Other sewage collection sources (not illustrated) feed into the sewage collection lines 18, 20. A stack 22 provides a vent from the collection lines 18, 20 to the atmosphere and ensures that the pressure in the collection lines 18, 20 remains at atmospheric.

The sewage collection lines 18, 20 provide means to conduct the sewage collected from the various receptacles into a sewer main or septic tank. The collection line 20 is at or below ground level and drains by gravity into the sewer main or septic tank. The collection line 20 provides a first clean out 24 at or near ground level between the sewage collection receptacles and the main sewer line. In addition, one or more clean outs 26 may be provided on exterior walls of the building, typically adjacent the kitchen sink 12.

The clean out 24 comprises an upstanding conduit section 28 having an end fitting 30 providing internal threads 32. In a conventional installation, a clean out plug (not shown) is provided having threads which mate with the threads 32. The backwater escape valve 34 of this invention comprises, as major components, a body member 36 and a valve member 38. The body member 36 includes a shank or section 40 having external threads 42 mating with the threads 32 and thus are the same diameter and pitch as the threads of the clean out plug (not shown). The threaded shank 40 also provides an internal passage 44 which is preferably circular in cross-section and which is symmetrical about a central longitudinal axis 46.

The body member 36 also includes a valve seat member 48 integral with the shank 40 providing a central passage 50 symmetrical about the axis 46 and being the same size and shape as the shank passage 44. It will thus be seen there are no shoulders, recesses or abutments in the passages 44, 50 which will collect solids or the like when the valve 34 opens to allow escape of backwater from the sewage collection lines 18, 20. The body member 36 provides a valve seat 52 of frustoconical shape symmetrical about the axis 46 and diverging at an angle of 20°-60° relative to the axis 46. The frustoconical valve seat 38 provides a small end merging with the central valve seat passage 50 and a large end merging with an annular lip 54.

The body member 36 is preferably made by injecting a molten organic polymer into a mold by a process known as injection molding. To provide part of a pivotal connection 56 between the body member 36 and the valve member 38, the mold is configured to provide a pair of ears 58 on the body member 36 having aligned openings 60 therein for receiving a pivot pin 62 as will be more fully explained hereinafter. The exterior of the valve seat member 48 is conveniently of circular cross section providing a plurality of axially extending ribs 64 spaced around the circumference of the member 48 to provide purchase when using pliers, a wrench or other mechanical force applier to unthread the backwater escape valve 34 from the clean out 24.

The valve member 38 comprises a generally circular plate like body 66 having an internal side 68 facing the passages 44, 50 and an external side 70. The internal side 68 provides a second annular lip 72 comprising a mirror image of the first lip 54 and abuts the first lip 54 in a closed position of the valve member 38. A frustoconical valve element 74 comprises a mirror image of the valve seat 52 and provides an O-ring 76 abutting and sealing against the valve seat 52.

The valve member 38 provides an arm 78 extending away from the body 64 having a passage 80 aligned with the passages 60 for receiving the pivot pin 62. The arm 78 extends away from the valve member 38 at a downwardly inclined angle to abut the valve body 36 as suggested by the arc 82. Interference between the arm 78 and the valve body 36 limits movement of the valve member 38 away from the valve body 36 to an arc of 30°–60°. A major purpose of limiting movement of the valve member 38 away from the valve body 36 is to make the valve member 38 automatically reseal against the valve body 36 after it is unseated. For example, if a child or animal were to unseat the valve member 38, it would automatically reseal against the valve body 36 when it is released.

Figure 3:
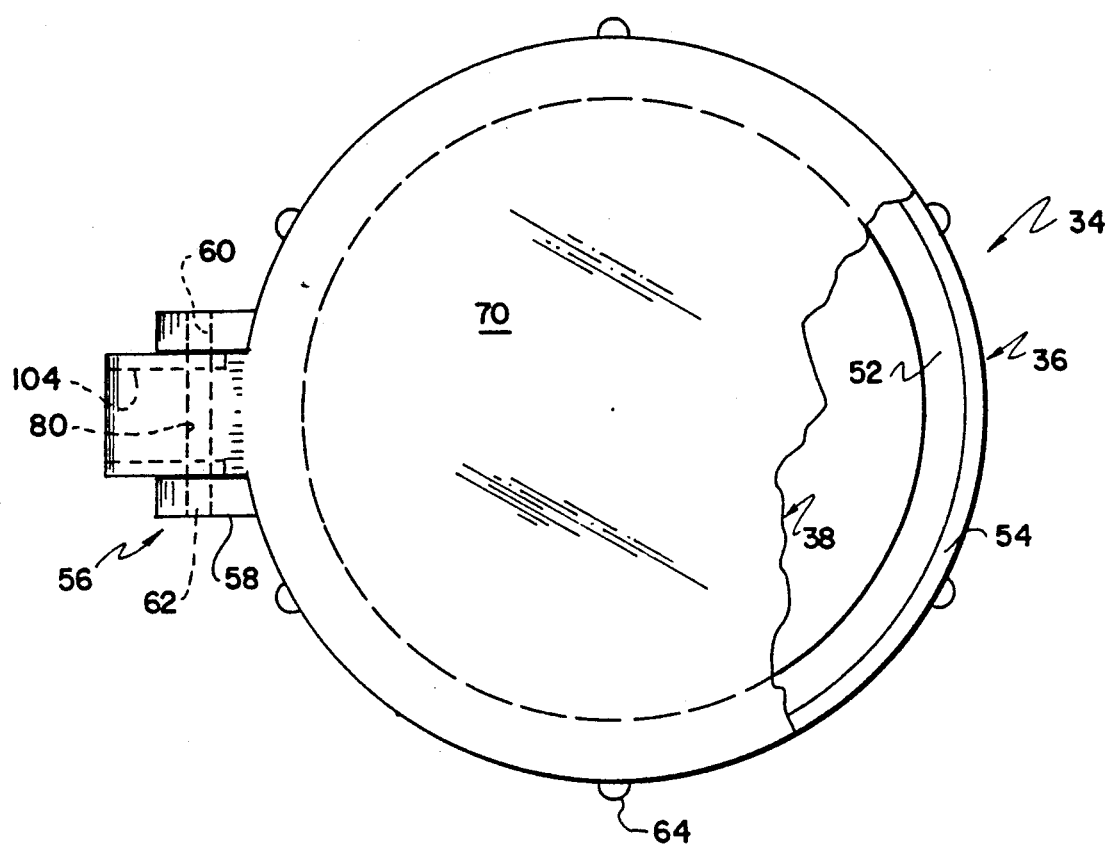
FIG. 3 is a top view of the backwater escape valve of FIG. 2.
Figure 4:
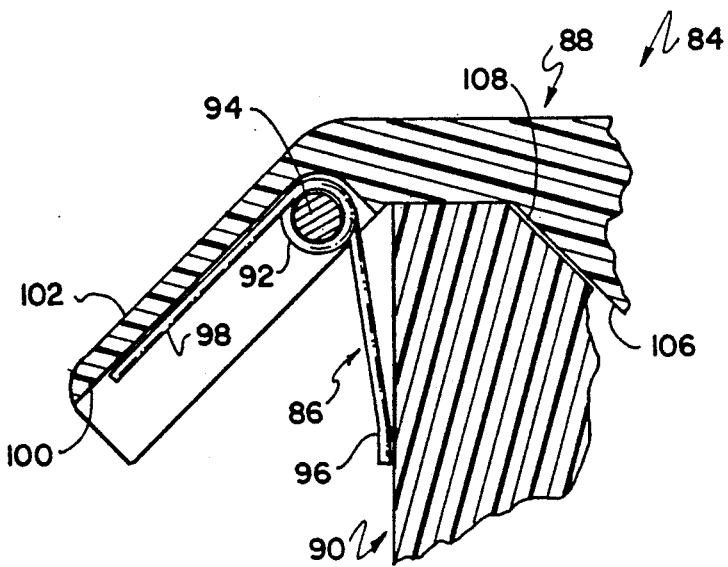
FIG. 4 is an enlarged cross-sectional view of another embodiment of the backwater escape valve of this invention.

Referring to FIG. 4, another embodiment of this invention comprises a valve 84 particularly suited for the clean out 26 in the vertical collection line 22. Typically, the clean outs 26 are of smaller diameter than clean outs 24 in the horizontal collection line 20 and, consequently, the valve 84 is of smaller size than the valve 34. The valve 84 is otherwise identical to the valve 34 except for two features. First, a spring 86 is provided to bias the valve member 88 toward the valve body 90. To this end, the spring 86 is of spring wire providing a central coil section 92 received on a pivot pin 94 corresponding to the pivot pin 62 in the embodiment of FIG. 2. The spring 86 includes a first arm 96 abutting against the valve body 90 and a second arm 98 residing in a slot 100 on one or both sides of the arm 102 and corresponding to the slots 104 in the arm 78 as shown best in FIGS. 2 and 3. In the embodiment of FIG. 4, limiting movement of the valve member 88 relative to the valve body 90 also acts to prevent the spring 86 from being sprung.

Figure 2:
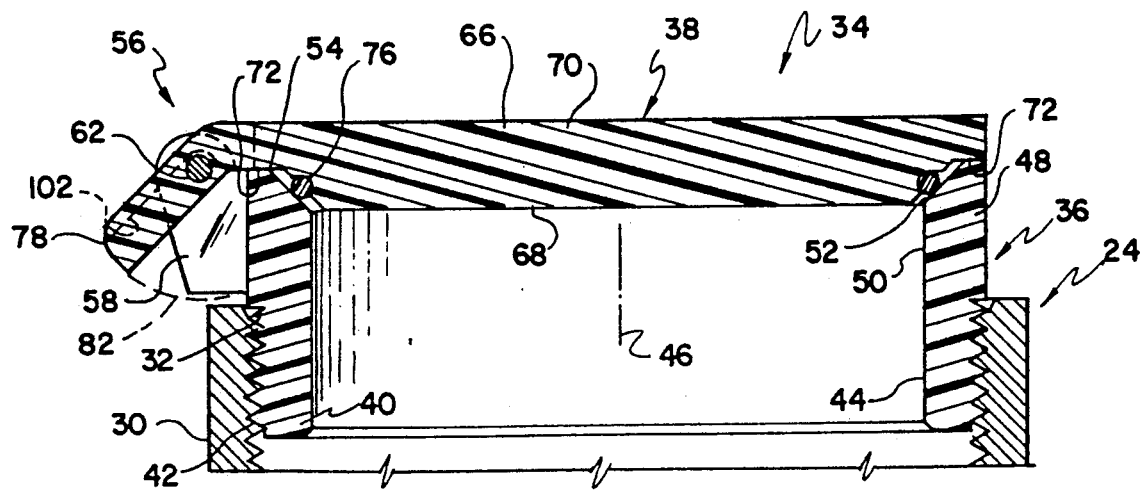
FIG. 2 is an enlarged cross-sectional view of the backwater escape valve of this invention.

The other difference between the embodiments of FIGS. 2 and 4 is that, in the embodiment of FIG. 4, the frustoconical valve element 106 closes on and seals against the frustoconical valve seat 108 without the provision of an O-ring or separate sealing member.

Operation of the backwater escape valves 34, 84 should now be apparent. In an existing sewage collection system, the clean out plugs (not shown) are unthreaded from the clean outs 24, 26. The valves 34, 84 are threaded into the clean outs 24, 26. In the clean out 26, the valve 84 is turned until the pivot pin 94 is at the top of the clean out 26 to allow the valve member 88 to rotate about a horizontal axis 110 at the top of the valve member 88. When the collection line 20 plugs up between the clean out 24 and the sink 12, the collection line 18 ultimately fills with water. The hydrostatic weight of the water opens the valve member 88 against the force of the spring 86 thereby allowing the water to drain on the outside of the building rather than back up through the toilets or other collection receptacles in the building. If the collection line 20 plugs up downstream of the clean out 24, the collection line 20 ultimately fills up with water and backs up into the collection line 18. The hydrostatic weight of the water opens the valve member 38 against the force of gravity acting on the valve member 38 thereby allowing the water to drain on the outside of the building rather than back up through the toilets or other collection receptacles in the building.

The backwater escape valves 34, 84 of this invention have many advantages. The valves may be made of injection molded parts and simply pinned together. The O-ring 76 in the embodiment of FIG. 2 is simple and easy to install. The valves 34, 84 are full opening and provide no internal shoulders or abutments to collect solids when the valves 34, 84 open and overflow.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A backwater escape valve comprising
   a body member having
      a threaded shank of the same pitch and diameter as external threads of a clean out plug and providing an internal passage of predetermined size and shape having a longitudinal axis;
      a valve seat member integral with the threaded shank providing
         a central passage symmetrical about the longitudinal axis and being the same size and shape as the shank internal passage,
         a valve seat being a frustoconical surface inclined to the longitudinal axis at an angle between 30°–60° having a small end adjacent the threaded shank and a large end, the small end merging with the central passage,
      an unthreaded exterior at least as large as the threaded shank having an axial extent sufficient to receive a mechanical force applier,
      a first annular lip perpendicular to the longitudinal axis merging, at an inner diameter thereof, with the large end of the valve seat and, at an outer diameter thereof, with the exterior of the body member,
      first pivotal mounting means extending from the exterior; and
   a valve member comprising
      a plate like body having an external side and an internal side, the internal side providing
         a second annular lip comprising a mirror image of the first annular lip for abutting the first lip in a closed position of the valve member,
         a frustoconical valve element comprising a mirror image of the frustoconical valve seat surface having means for sealing against the frustoconical valve seat surface, and
      second pivotal mounting means extending from the plate like body and means interconnecting the first and second pivotal mounting means for enabling movement of the valve member from a first closed position where the first and second lips abut and the frustoconical valve element sealing means abuts the frustoconical valve seat surface and a second open position; and means cooperating between the body member and the valve member for limiting movement of the valve member away from the body member in a range of 20°-60°.

2. The backwater escape valve of claim 1 wherein the shank internal passage is of circular cross-section, the valve seat central passage is of circular cross-section and the small end of the valve seat is of circular cross section and of the same size as the central passage.

3. The backwater escape valve of claim wherein the first pivotal mounting means comprises a first lug extending radially away from the longitudinal axis and the second pivotal mounting means comprises a second lug extending away from the plate like body.

4. The backwater escape valve of claim 3 wherein the first and second lips define a plane perpendicular to the longitudinal axis and the second lug extends away from the plate like body at an acute angle relative to the plane providing a terminal end overlying the body member, the means for limiting movement between the valve member and the body member comprising the terminal end of the second lug.

5. The backwater escape valve of claim 4 wherein the first pivotal mounting means comprises a pair of spaced apart apertured first lugs and the second lug provides a passage therethrough and is received between the first lugs, and the means interconnecting the first and second lugs comprising a pivot pin extending through the apertures of the first lugs and the passage of the second lug, the second lug providing a section substantially abutting the first lugs and a recess extending radially away from the pivot pin.

6. The backwater escape valve of claim 5 further comprising a spring having a coil section residing in the recess and receiving the pivot pin therethrough, a first reaction member connected to the coil section abutting the second lug and a second reaction member abutting the body member for biasing the valve member toward the closed position.

7. The backwater escape valve of claim 1 wherein the body member exterior is of generally circular shape having a plurality of ribs extending generally parallel to the longitudinal axis providing purchase for a mechanical force applier.

* * * * *